Nov. 1, 1955   F. E. MUNSCHAUER   2,722,298
PRESSURE CLUTCH AND BRAKE CONTROL FOR PUNCH PRESSES
Filed April 8, 1950
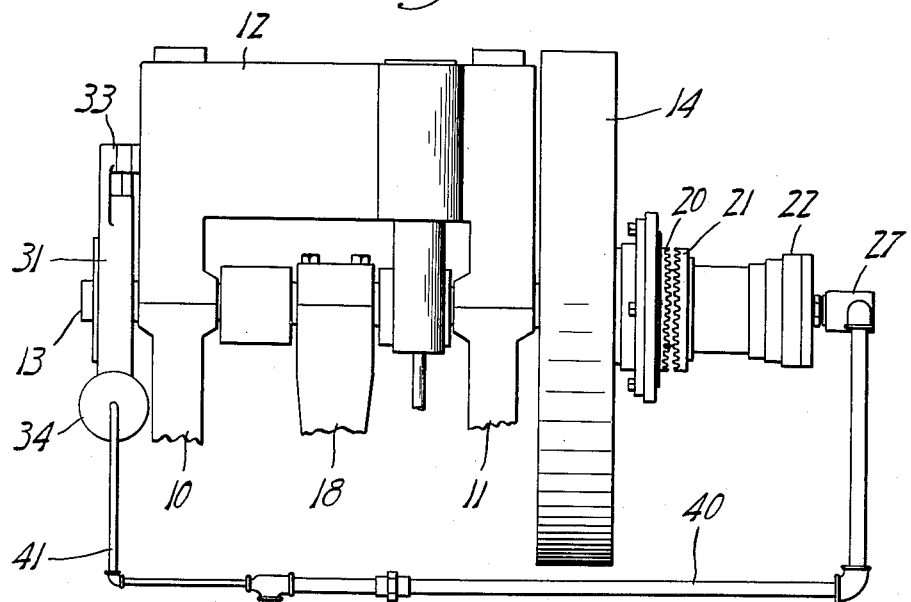
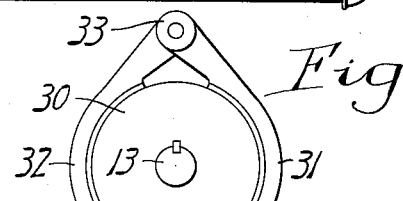
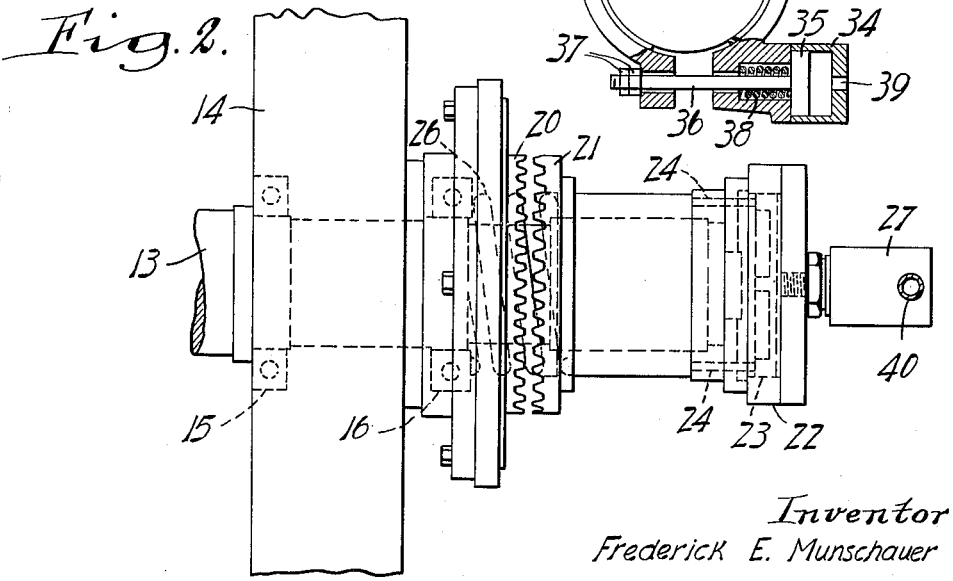
Inventor
Frederick E. Munschauer
by
Bean, Brooks, Buckley & Bean.
Attorneys

United States Patent Office 2,722,298
Patented Nov. 1, 1955

2,722,298

PRESSURE CLUTCH AND BRAKE CONTROL FOR PUNCH PRESSES

Frederick E. Munschauer, Buffalo, N. Y., assignor to Niagara Machine & Tool Works, Buffalo, N. Y.

Application April 8, 1950, Serial No. 154,806

4 Claims. (Cl. 192—12)

This invention relates to drive control means for power presses, power brakes, power shears, and analogous machinery and particularly to the means for transmitting intermittent driving impulses to the work performing parts of the machine from a constantly rotating driving member.

The principles of the present invention are disclosed herein in connection with power-operated sheet metal stamping machines, such as presses, brakes, and shears. However, the principles of the invention are applicable wherever the advantages incident thereto are of benefit. In power punch presses, brakes, and shears, it is of particular importance to provide drive control means which operate to start and stop the ultimate work performing parts of the machine quickly and at correct predetermined positions.

In the power press and shear art generally, it has been found desirable and in most cases essential to provide some kind of brake or drag means or other detaining means to arrest the work performing parts of the machine when the drive is interrupted and hold the work performing parts in their proper idle or rest position. It is common in punch press and shear art to provide a constantly applied friction brake with the normal running of the work performing parts being accomplished without release of the brake and against the brake friction. Despite the age and high state of development of this art, the problem of providing proper braking or detaining means is of such complexity that the constantly applied brake is the usual mode of design and operation despite the obvious mechanical inefficiency of this expedient.

The present invention provides a novel control arrangement wherein a positive jaw clutch and a friction brake are correlated and provided with control means which render the clutch and the brake alternatively effective in a novel and highly satisfactory manner. The control means of the present invention operates automatically to time the operation of the clutch and the brake in such a way that their cycles of effectiveness overlap at the beginning of a pressing operation and are spaced, from the standpoint of time, at the end of a cycle of operation.

More particularly, the present invention provides a jaw clutch with an axially movable clutching and declutching element, and fluid presure means for urging the clutch parts together, in combination with a normally engaged brake with fluid pressure means for releasing the brake. The fluid pressure means of these two components are so timed that the clutch engages a short time before the brake becomes disengaged through the action of the fluid pressure means at the beginning of a working stroke of a pressor shear. At the end of such working stroke, the clutch disengages, or at least begins to disengage and substantially accomplishes a considerable part of the disengaging movement, before the brake is again applied.

This novel mode of relating the operation of a jaw clutch and a friction brake is found to be highly advantageous. Clutch engagement is much more satisfactorily effected with the brake applied, even though initial movement of the drive shaft upon clutch engagement is accomplished against the resistance of the brake. This mode of operation eliminates a situation where the teeth of the constantly rotating clutch part strike the more or less free but stationary clutch part and cause a bouncing and partial engagement which is objectionable from an operational standpoint and may even cause the slide of the press, for instance, to start down ahead of the impulse of the driving clutch part. The slide may fall freely by gravity if the drive shaft is initially bounced far enough, upon partial engagement, to push the driving eccentric or crank shaft a material distance beyond its top dead-center.

At the end of a pressing or shearing cycle in a machine of this general nature, pressure on the jaw teeth produces friction at the teeth and also very considerable friction in the spline upon which the axially movable jaw clutch part generally slides. This excessive friction cannot, of course, be avoided in the case of constantly applied friction brakes. By the present mode of operation the brake is not re-applied until declutching has taken place so that there is no substantial torque load on the jaws of the clutch or the splines mentioned above during the declutching operation, the parts being released or substantially released in a wholly free, unstressed condition.

Conventional mechanical power presses are usually provided with rigid type single-revolution clutches, and their construction and operation are well-known in this art. Partial strokes of the reciprocating slide of the presses so equipped, such as are required in setting up and adjusting dies, can be accomplished only by manual movement of the press parts and not through employment of the usual driving motor. According to the present invention, either partial movements or complete operating cycles of the press may be simply achieved by push-button controlled power operation and the stopping of the press, either in full cycle or partial cycle operation, is abrupt and accurate.

A single embodiment of the principles of the present invention is illustrated in the drawing and described in detail in the following specification, but it is to be understood that this embodiment is merely by way of example, and that the scpoe of the present invention is not limited otherwise than as defined in the appended claims.

In the drawing:

Fig. 1 is a fragmentary elevational view, partially schematic, showing the upper portion of a punch press provided with one form of the control means of the present invention;

Fig. 2 is a similar view, likewise fragmentary, but on an enlarged scale and showing only the right-hand portion of the structure of Fig. 1; and Fig. 3 is a side elevational view taken from the left as viewed in Fig. 1 and showing only the braking mechanism.

Like characters of reference denote like parts in the several figures, and the numerals 10 and 11 designate the side frames of a punch press having a crown 12, a drive shaft 13, and a flywheel or drive pulley 14 which may have anti-friction bearing on shaft 13 as indicated at 15 and 16 in Fig. 2. In Fig. 1 the numeral 18 designates a connection or connecting rod which engages about a centrally disposed crank or eccentric on shaft 13 and extends downwardly to a pivotal or universal joint connection with a press slide or ram (not shown).

The clutch of the present invention is generally similar to the clutch illustrated and described in detail in my co-pending application for Letters Patent Serial No. 25,632, filed May 7, 1948, now Patent No. 2,620,054, patented December 2, 1952, and will accordingly be described only briefly herein. A jaw clutch element 20 is fixed for rotation with flywheel or pulley 14, and a complementary jaw clutch element 21 is splined to drive shaft 13 for free axial movement but is restrained to rotate with drive shaft 13.

The numeral 22 designates a cylinder having a piston 23, and a series of pins 24 which are slidable in a direction parallel to the axis of shaft 13 and engage between piston 23 and the right-hand end of slidable clutch element 21. The clutch is normally held in disengaged position by a spring 26, which tends to urge the clutch element 21 to the right, as viewed in Figs. 1 and 2. When air pressure is directed against the right-hand surface of piston 23 through a relatively rotatable fitting 27, piston 23 moves to the left and, through pins 24, moves clutch element 21 to engaged position with respect to clutch element 20.

Referring to Fig. 3, the brake comprises merely a drum 30 fixed to drive shaft 13 and a pair of external contracting band brake shoes 31 and 32 pivoted to the press frame as at 33. A cylinder 34 is fixed to the lower end of brake shoe 31 and has a piston 35 and a piston rod 36 which extends through the lower end of brake shoe 32 where it receives nuts 37. A compression coil spring 38 acts between the left-hand end of the interior of cylinder 34 and the piston 35, tending to urge the latter to the right in cylinder 34 and thus pull the lower ends of brake shoes 31 and 32 toward each other. This holds the bands of the brake shoes normally in braking engagement with drum 30. When air is applied to cylinder 34 through fittings 39, it forces piston 35 to the left against the resistance of spring 38 and thus releases the brake shoes.

Referring to Fig. 1, the numerals 40 and 41 designate air pressure lines to the clutch and the brake, respectively. These lines may have a common supply conduit 42 which leads from a conventional three-way solenoid-operated valve 43, the operating solenoid being indicated at 44. Valve 43 has a vent passage 46 and an air pressure supply passage 47. In its off position, vent passage 46 is connected with conduit 42, and thus spring 26 holds the clutch in a disengaged position and spring 38 holds the brake in a braking position. When solenoid 44 is energized, pressure supply passage 47 is connected to conduit 42, and the clutch is engaged and the brake disengaged through operation of their respective piston and cylinder devices.

It will be noted that the line 41 to brake cylinder 44 is substantially smaller in effective cross-sectional area than the line 40 to clutch cylinder 22. By this simple expedient, provision is made for getting an effective air pressure force to the clutch cylinder 22 in advance of the arrival of effective air pressure at brake cylinder 34. Accordingly, the clutch engages a very brief period ahead of the release of the brake mechanism. Conversely, when solenoid 44 is de-energized, the larger line 40 will vent more freely and thus permit spring 26 to disengage the clutch parts before cylinder 34 is sufficiently vented to cause the brake shoes to re-engage drum 30.

It is to be understood that other and more elaborate means may be provided for producing this desired sequence of operation without departing from the principles of the present invention. For instance, separate but related valves might be employed for activating the clutch and brake cylinders with any of the well-known time delay electrical relays for timing the valves to produce the foregoing sequence of operations, both in the engagement of the clutch and release of the brake and in the disengagement of the clutch and engagement of the brake. Another alternative means of timing the operation is through the use of a sequence valve of a type which is available commercially and provides primary and secondary outlets, the secondary outlet being connected to pressure only after a predetermined pressure has been established at the primary outlet.

The valve 43 may be employed as shown in Fig. 1 to apply pressure jointly and simultaneously to both conduits 40 and 41 and a separate time delay, relief or differential pressure valve may be interposed in conduit 41 to insure the desired sequence of operation without relying on the reduced cross-sectional area of conduit 41 for delayed operation of the brake piston.

While frequent reference is had herein to jaw clutches, it is to be understood that that term is intended to embrace any rigid positive type of clutch operating in an equivalent manner.

What is claimed is:

1. In a control system for power presses, shears and like machines, a continuously rotating drive element and an intermittently rotatable driven element, a positive jaw clutch acting between said driving and driven elements and having an axially slidable part for effecting engagement and disengagement thereof, spring means for holding said part normally disengaged, pneumatic fluid pressure operated means for sliding said part to engage the clutch, a normally engaged brake acting upon said driven element, spring means urging said brake to engaged position and pneumatic fluid pressure operated means for releasing said brake, a conduit connecting with said fluid pressure operated clutch engaging means and a conduit of substantially less effective cross sectional area connecting with said fluid pressure operated brake releasing means, a pneumatic fluid pressure source for actuating both of said fluid pressure operated means, and valve means selectively operable to connect said pressure source substantially simultaneously to both of said conduits.

2. In a control system for power presses, shears and like machines, a continuously rotating drive element and an intermittently rotatable driven element, a positive jaw clutch acting between said driving and driven elements and having an axially slidable part for effecting engagement and disengagement thereof, spring means for holding said part normally disengaged, pneumatic fluid pressure operated means for sliding said part to engage the clutch, a normally engaged brake acting upon said driven element, spring means urging said brake to engaged position and pneumatic fluid pressure operated means for releasing said brake, a conduit connecting with said fluid pressure operated clutch engaging means and a conduit of substantially less effective cross sectional area connecting with said fluid pressure operated brake releasing means, a pneumatic fluid pressure source for actuating both of said fluid pressure operated means, and valve means selectively operable to connect said pressure source substantially simultaneously to both of said conduits and to substantially simultaneously disconnect said pressure source therefrom.

3. In a control system for power presses, shears and like machines, a continuously rotating drive element and an intermittently rotatable driven element, normally disengaged positive mechanical clutch means acting between said driving and driven elements and having a part movable to effect engagement and disengagement thereof, pneumatic fluid pressure operated means for moving said part to engage the clutch, a normally engaged brake acting upon said driven element, pneumatic fluid pressure operated means for releasing said brake, a conduit connecting with said fluid pressure operated clutch engaging means and a conduit of substantially less effective cross sectional area connecting with said fluid pressure operated brake releasing means, a pneumatic fluid pressure source for actuating both of said fluid pressure operated means, and valve means selectively operable to connect said pressure source substantially simultaneously to both of said conduits.

4. In a control system for power presses, shears and like machines, a continuously rotating drive element and an intermittently rotatable driven element, normally disengaged positive mechanical clutch means acting between said driving and driven elements and having a part movable to effect engagement and disengagement thereof, pneumatic fluid pressure operated means for moving said part to engage the clutch, a normally engaged brake acting upon said driven element, pneumatic fluid pressure operated means for releasing said brake, a conduit connecting with said fluid pressure operated clutch engaging means and a conduit of substantially less effective cross sectional area connecting with said fluid pressure operated brake releasing means, a pneumatic fluid pressure source for actuating both of said fluid pressure operated means, and valve means selectively operable to connect said pressure source substantially simultaneously to both of said conduits and to substantially simultaneously disconnect said pressure source therefrom.

References Cited in the file of this patent

UNITED STATES PATENTS

| | | |
|---|---|---|
| 1,298,956 | Johnson | Apr. 1, 1919 |
| 1,566,111 | Miller | Dec. 15, 1925 |
| 1,784,547 | Schmidt et al. | Dec. 9, 1930 |
| 1,869,085 | Williamson | July 26, 1932 |
| 2,023,597 | Klocke et al. | Dec. 10, 1935 |
| 2,356,598 | Lang et al. | Aug. 22, 1944 |
| 2,706,026 | Georgeff | Apr. 12, 1955 |